March 18, 1952    R. S. RAYMOND ET AL    2,589,629
MECHANICAL LEAD SLAPPER

Filed July 17, 1950    3 Sheets-Sheet 1

INVENTOR.
ROGER S. RAYMOND
GERALD W. McGEE
BY
William R. Lane
ATTORNEY

March 18, 1952 R. S. RAYMOND ET AL 2,589,629
MECHANICAL LEAD SLAPPER
Filed July 17, 1950 3 Sheets-Sheet 2

INVENTOR.
ROGER S. RAYMOND
GERALD W. McGEE
BY William R. Lane
ATTORNEY

March 18, 1952     R. S. RAYMOND ET AL     2,589,629
MECHANICAL LEAD SLAPPER

Filed July 17, 1950     3 Sheets-Sheet 3

INVENTOR.
ROGER S. RAYMOND
GERALD W. McGEE
BY
William R. Lane
ATTORNEY

Patented Mar. 18, 1952

2,589,629

UNITED STATES PATENT OFFICE 2,589,629

MECHANICAL LEAD SLAPPER

Roger S. Raymond, Redondo Beach, and Gerald Woodward McGee, Los Angeles, Calif., assignors to North American Aviation, Inc.

Application July 17, 1950, Serial No. 174,280

3 Claims. (Cl. 153—39)

This invention comprises means for performing finishing operations on sheet metal parts, and particularly for formed flanges and the like. Many sheet metal components, and particularly aluminum alloy parts such as are used, for example, in the aircraft industry, are formed by means of a hydropress operation. This forming operation is frequently accomplished by using a single male die member and a rubber blanket enclosed within the upper platen of the press. Aircraft parts such as, for example, a wing rib which normally resembles the shape of a "tear drop" and has a right angle flange subtended around its periphery for intimate attachment to the upper and lower wing surfaces, are produced by the hydropress method. While the hydropress type of forming requires a minimum of expenditure for dies, and is rapid in operation, certain limitations of this system precludes the attainment of curved right angle flanges which are entirely free from wrinkles or bulges of excess material. Customarily a hand finishing operation is required to "iron" or smooth out the excess material in the wrinkled portions of the flange. Also, the hydropress rubber pad does not always exert a high enough force in certain localized areas to satisfactorily close the flanged portions of the part to the required angular degree.

It has in the past been common expediency to resort to a procedure known as "lead slapping" to obtain the desired finished pieces. This time honored and laborious operation consists in using an elongated strip of lead to strike the metal part being formed to beat the material into close conformity with the die. The lead strip is malleable and tends to conform to the contour of the work piece which is held in contact with the forming die block during the operation. The lead does not mar the part and the "slapping" contact tends to spread the force of the blow over an extended area and is capable of causing the metal to flow under the impact, resulting in an actual shrinking of the excess material until a uniformly smooth flange is obtained.

It is therefore an object of the present invention to provide means for performing finishing operations on formed metal parts.

It is a further object of the present invention to provide metal forming means arranged to deliver a maximum effective force at a desired point of impact.

It is another object of the present invention to provide mechanical shaping means which are universally adaptable to performing finishing operations on formed sheet metal parts of widely varying sizes, shapes, and contours.

It is also an object of the present invention to provide means which function rapidly and mechanically to replace laborious hand methods of hammering out wrinkles in formed metal parts.

It is a further object of the present invention to provide an arrangement for accomplishing finishing operations on formed metal articles by means of which a movable impact member of malleable property conforms a wrinkled surface to a uniformly smooth die by repeated blows of the impact member.

Other objects of the invention will become apparent from the following description taken in connection with the accompanying drawings, in which Fig. 1 is a top plan view of the subject machine;

Figure 1:
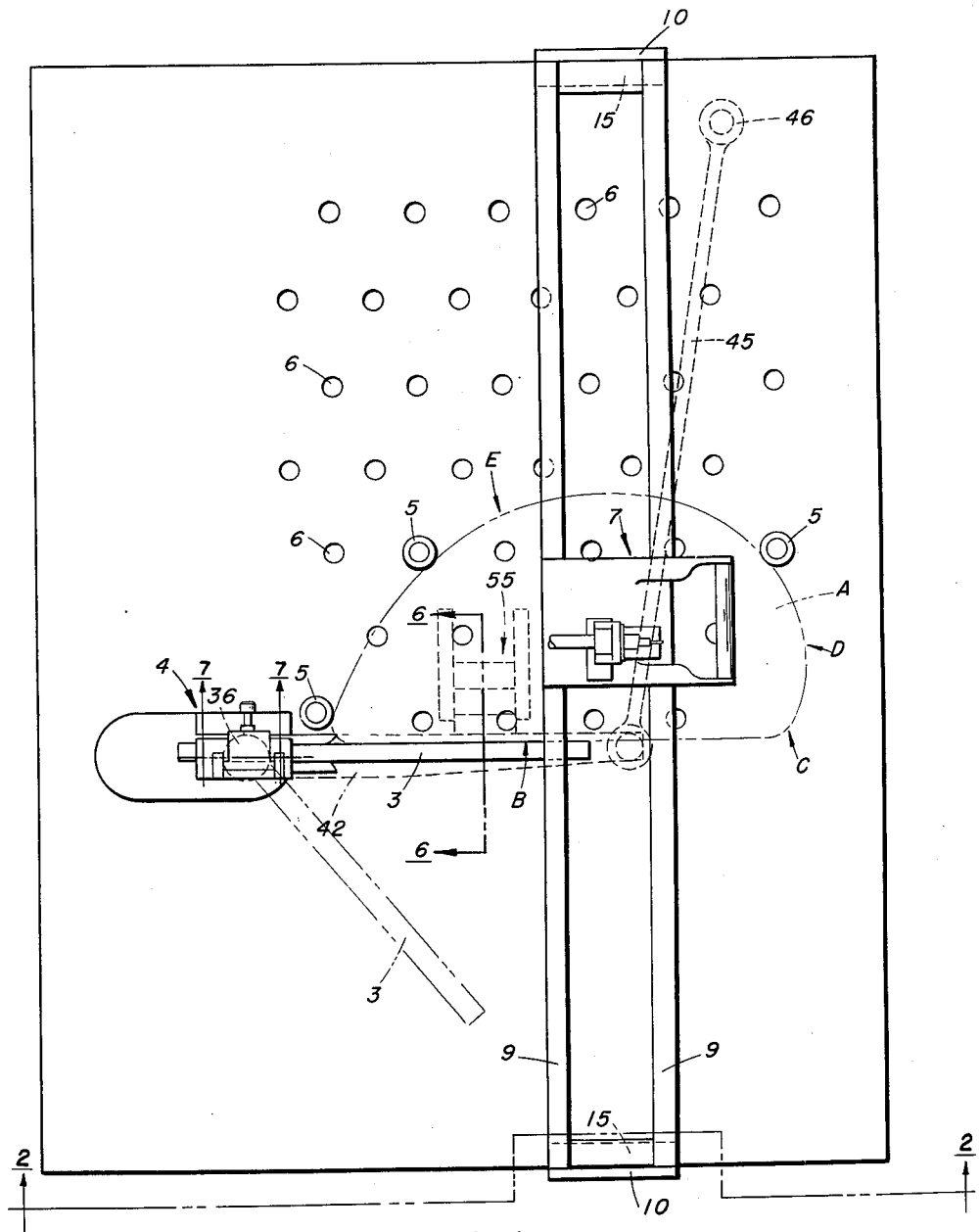

Referring to the drawings, the subject machine comprises a work table 1 supported upon legs 2 and having malleable strip of lead 3 engaged in securing means indicated at 4 and arranged for limited swinging movement parallel to the upper surface of the table 1. A sheet metal part or work piece indicated in Fig. 1 at A, in phantom, positioned upon the die on which it is produced in the hydropress, is placed upon the work table where it may be conveniently positioned against pins 5 engaging appropriate apertures 6 in the work surface. Clamping means indicated at 7 is provided above the work table. This may comprise a small air or hydraulic cylinder 8 slidably supported for longitudinal movement upon a pair of channels 9 overlying the work table 1. The channels are supported by end plates 10 arranged for transverse movement upon pairs of small rollers 11 which engage the edges of the table. The clamping unit 7 may be manually positioned at the desired location over the work piece by means of a handle 13. The work piece on the die is secured in position against the stop pins 5 by a pressure head 12 attached to the piston rod of the cylinder 8, a control handle 14 being provided for the valve of cylinder 8. A small lip or flange 15 along the bottom of plates 10 engages the lower face of the table 1 to retain the cylinder supporting members against upward displacement. The strip 3 swings through a limited arc causing the lead strip to strike sharply against the flanged portions about the peripheral portions B of the work piece, whereby the metal may be beaten into the finished form, removing small wrinkles and bulges which impair the accuracy of the part as it comes from the hydropress.

The die block and work piece may be repositioned as required in order to permit the blows of the lead strip 3 to be successively applied to additional areas as at C—D—E, etc.

Figure 2:
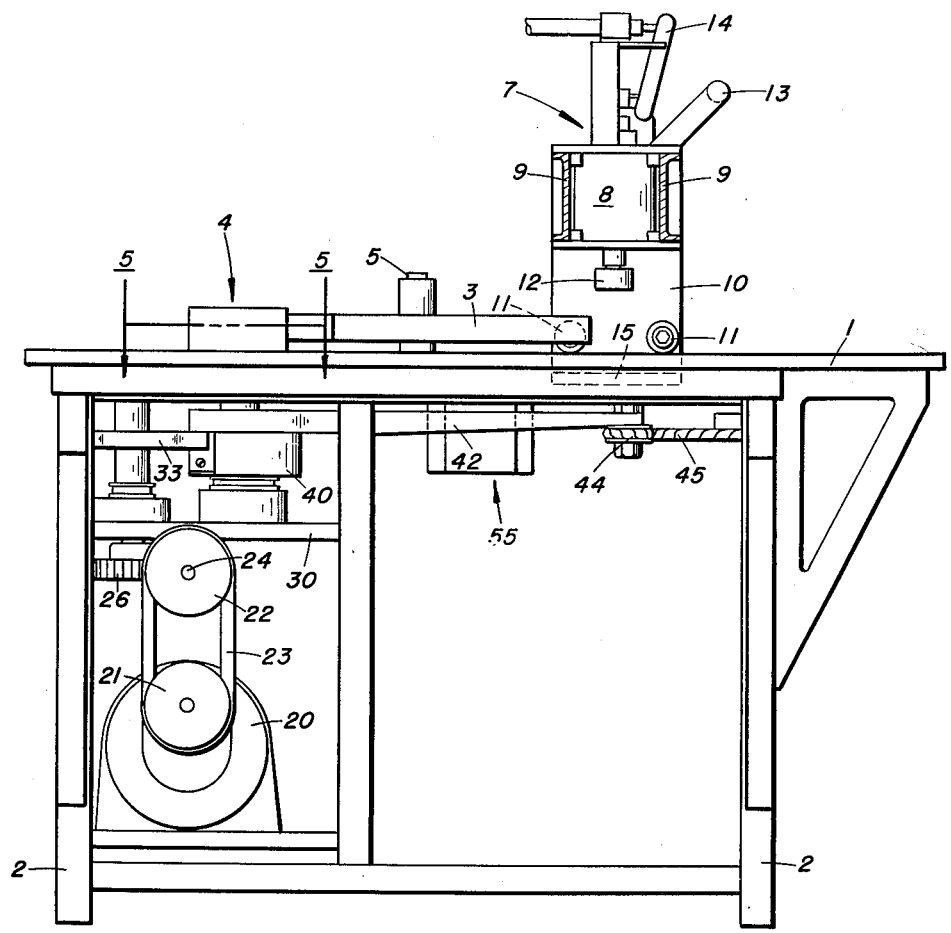
Fig. 2 is a side elevation of the unit with the portion in section indicated at line 2—2 of Fig. 1.
Figures 6, 7:
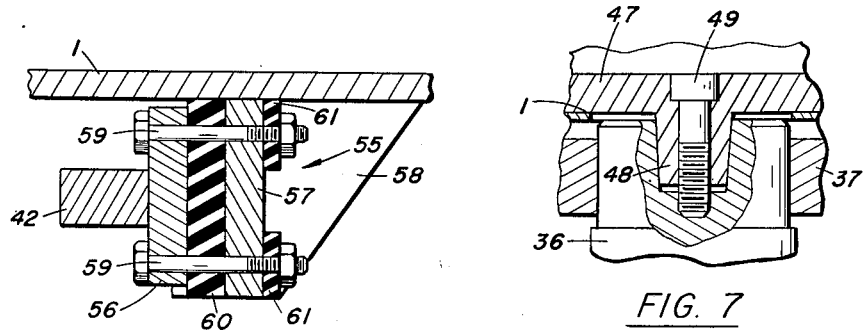
Fig. 6 is an enlarged detail in section taken at line 6—6 of Fig. 1.
Fig. 7 is an enlarged detail, partly in section, taken at line 7—7 of Fig. 1.
Figure 3:
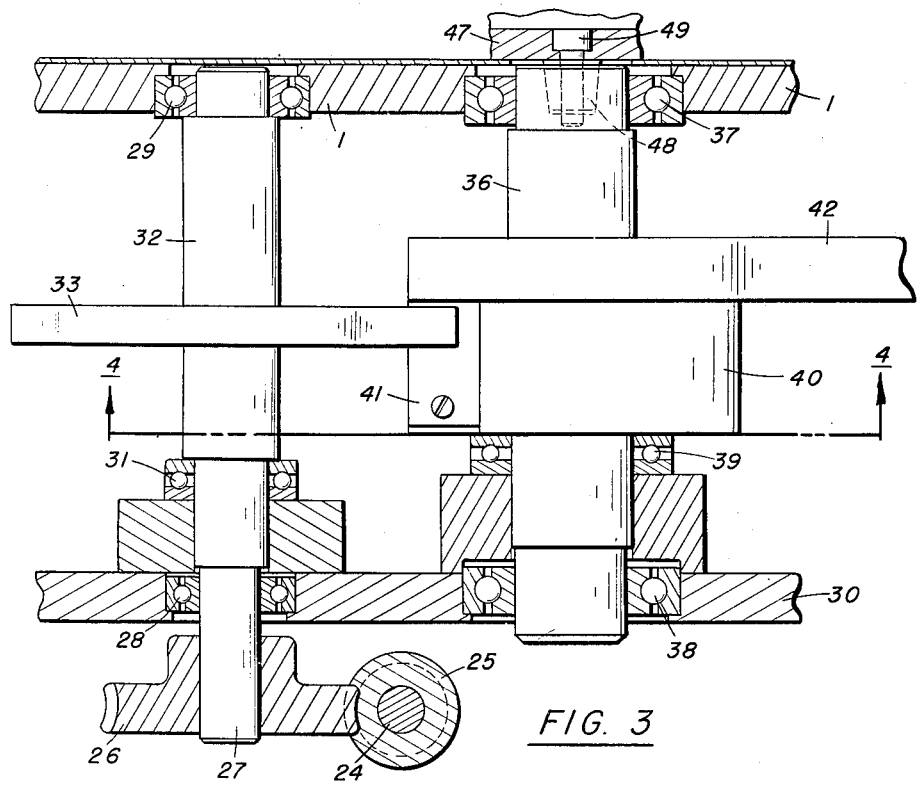
Fig. 3 is an enlarged detail, partially in section, of the drive mechanism.
Figure 4:
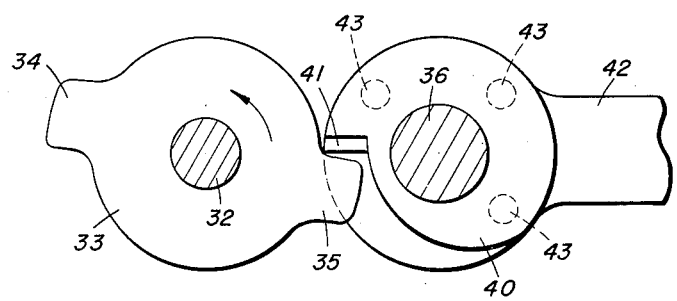
Fig. 4 is a section taken at line 4—4 of Fig. 3.
Figure 5:
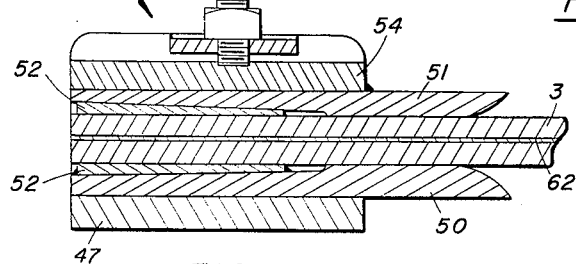
Fig. 5 is an enlarged detail showing a section taken at 5—5 of Fig. 2.

As may be best seen in Fig. 2, the lead strip 3 is driven by an electric motor 20 through an appropriate drive such as pulleys 21—22 interconnected by a belt 23, the pulley 22 driving a shaft 24 upon which a worm gear 25 is mounted for engagement with a worm wheel 26. Referring to Fig. 3, the worm wheel is mounted upon a vertical shaft 27 journaled in bearings 28—29 supported respectively upon structural member 30 and the underside of the work-supporting surface 1. A thrust bearing is also provided at 31 to further assist in properly supporting the shaft 27. The upper portion 32 of the shaft 27 is enlarged and carries a cam 33 having a pair of lobes 34—35. A secondary shaft 36 is mounted parallel to the shaft 32 and is journaled in bearings 37—38 mounted upon the work supporting table 1 and the structural member 30 respectively, a thrust bearing being also provided at 39. Shaft 36 carries a cam follower 40 having a single cam engaging surface 41 arranged for engagement with the lobes 34—35 of the cam 33. An arm 42, secured to the cam follower by a series of bolts 43, has secured to the outer end a fitting 44 by means of a bolt. A length of heavy elastic shock cord 45 is secured at one end to the fitting 44, the opposite end being secured at 46 to a fitting on a table support member 2. As the cam 33 drives the follower 40, the elastic cord 45 is placed in tension, the stored energy being released as the peak of each lobe of the cam is passed. A fitting 47 is secured to the upper end of the shaft 36 where it passes up through the table 1. A shouldered portion 48 on the lower surface of the fitting 47 is received in a recess in the end of the shaft 36, a socket head set screw 49 serving as a retaining means. The lead strip 3 is inserted in the fitting 47 engaging a pair of clamping members 50—51 having serrated faced retaining means 52 as inserts. A set screw 53 mounted in the fitting 47 bears against a movable block 54 which carries the clamping member 51 for locking the lead strip 3 securely in place between the faces 52.

In operation, with the work piece as indicated in phantom in Fig. 1 secured in position, the lead strip 3 is caused to strike a series of sharp slapping blows against the desired area of the part being formed. The lead strip 3 may be reinforced by the inclusion of a flexible steel strip 62 in the center. The lead strips 3 are generally cast and the member 62 is provided with perforations to assist in bonding. An intermittent swinging action is imparted to the strip 3 by virtue of the cam lobes 34—35 bearing in succession against the cam follower surface 41, the motor 20 running continuously. A conventional foot switch (not shown) may be provided to permit the operator to energize the motor 20. The part upon which the work is being done is normally positioned so as to intercept the stroke of the lead strip 3, being subjected thereby to the full force of the blow which is generated by the return energy of the elastic cord 45 as the cam follower face slips past the lobe of the cam at the peak of its travel. The arm 42 and the lead strip 3 are moved simultaneously through their interconnection by shaft 36. To prevent damage to the structure a shock absorbing unit indicated generally at 55 is provided beneath the work table 1 for engagement with the arm 42 in the event of over-travel of this member. As a means for absorbing the energy of the elastic cord 45 in the event the work piece is not properly positioned, a steel plate 56 is provided for receiving contact with the arm 42. The plate 56 is mounted upon a structural member 57, depending from the lower surface of the table 1 and reinforced by angles 58. The plate 56 is supported and resiliently retained for limited transverse movement by bolts 59. Resilient material is provided at 60 to permit the plate 56 to retreat slightly under the impact force of the arm 42. Washers 61 of resilient material are also provided about the bolts 59 bearing against the opposite surface of member 57 to further assist in absorbing the recoil forces from impact.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A sheet metal forming machine comprising a work supporting table; a die on said table; means for securing and positioning formed sheet metal on said die; a malleable impact member pivotally mounted on said table; resilient means interconnected with said impact member for urging said member against said sheet material and die; and means for intermittently pivoting said impact member away from said die and thereupon releasing said member whereby said resilient means drives said impact member against said sheet material and die.

2. A sheet metal forming machine comprising a work supporting table; a die on said table; clamping means for securing said die on said table; an elongated malleable impact member; a shaft pivotally mounting said impact member on said table; resilient means connected with said shaft for pivoting said impact member in one direction toward said die; and cam means operative for intermittently rotating said shaft in the opposite direction in opposition to said resilient means and thereupon releasing said shaft for allowing said resilient means to drive said impact member against said die.

3. A sheet metal forming machine comprising a work supporting table; a die on said table; clamping means for securing said die on said table; an elongated malleable impact member; a shaft for pivotally mounting said impact member on said table; an arm secured to and projecting radially from said shaft; resilient means interconnecting said arm and portions of said table for rotating said shaft in one direction thereby urging said impact member against said die; and cam means operative for rotating said shaft in the opposite direction in opposition to said resilient means and thereupon releasing said shaft for allowing said resilient means to drive said impact member against said die.

ROGER S. RAYMOND.
GERALD WOODWARD McGEE.

REFERENCES CITED

The following references are of record in the file of this patent:

UNITED STATES PATENTS

| Number | Name | Date |
|---|---|---|
| 690,320 | Robertson | Dec. 31, 1901 |
| 735,937 | Dubes | Mar. 28, 1905 |
| 1,231,453 | Tait | June 26, 1917 |
| 1,952,908 | Connell | Mar. 27, 1934 |
| 2,052,355 | Lippard | Aug. 25, 1936 |

FOREIGN PATENTS

| Number | Country | Date |
|---|---|---|
| 202,201 | Germany | Oct. 1, 1908 |
| 698,594 | Germany | Nov. 10, 1940 |